United States Patent
Jeong et al.

(10) Patent No.: US 10,614,956 B1
(45) Date of Patent: Apr. 7, 2020

(54) MULTILAYER CAPACITOR FOR IMPROVED BENDING STRENGTH CHARACTERISTICS

(71) Applicant: SAMSUNG ELECTRO-MECHANICS CO., LTD., Suwon-si, Gyeonggi-do (KR)

(72) Inventors: Do Young Jeong, Suwon-si (KR); Je Jung Kim, Suwon-si (KR); Do Yeon Kim, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/189,779

(22) Filed: Nov. 13, 2018

(51) Int. Cl.

| H01G 4/012 | (2006.01) |
| H01G 4/30 | (2006.01) |
| H01G 4/232 | (2006.01) |
| H01G 4/12 | (2006.01) |
| H01G 4/008 | (2006.01) |

(52) U.S. Cl.
CPC .............. *H01G 4/012* (2013.01); *H01G 4/232* (2013.01); *H01G 4/30* (2013.01); *H01G 4/0085* (2013.01); *H01G 4/1227* (2013.01)

(58) Field of Classification Search
CPC .......... H01G 4/005; H01G 4/232; H01G 4/30; H01G 4/1227; H01G 4/12; H01G 4/235; H01G 4/012

See application file for complete search history.

(56) References Cited

U.S. PATENT DOCUMENTS

| 2007/0128794 A1* | 6/2007 | Kusano ................ H01G 4/2325 438/253 |
| 2011/0007449 A1* | 1/2011 | Seo ........................ H01G 4/232 361/321.2 |

(Continued)

FOREIGN PATENT DOCUMENTS

| JP | 02312217 A | * 12/1990 |
| JP | 05135990 A | * 6/1993 ............... H01G 4/30 |

(Continued)

OTHER PUBLICATIONS

Korean Office Action dated Nov. 20, 2019 issued in Korean Patent Application No. 10-2018-0115497 (with English translation).

*Primary Examiner* — David M Sinclair
(74) *Attorney, Agent, or Firm* — Morgan, Lewis & Bockius LLP

(57) ABSTRACT

A multilayer capacitor includes a body including dielectric layers and a plurality of first and second internal electrodes having an average thickness less than 1 μm; and first and second external electrodes each including first and second conductive layers including first and second head portions and first and second band portions, and first and second conductive resin layers each covering the first and second conductive layers. An average thickness of the dielectric layers may be greater than the average thickness of the first and second internal electrodes, and portions of the first and second internal electrodes overlapping an end of the first or second band portion in a width direction of the body may be formed as first and second extending portions having a width relatively greater than those of other portions of the first and second internal electrodes, respectively.

18 Claims, 7 Drawing Sheets

(56) References Cited

U.S. PATENT DOCUMENTS

| | | | |
|---|---|---|---|
| 2011/0096463 A1* | 4/2011 | Togashi | H01G 4/228 361/306.3 |
| 2011/0273815 A1* | 11/2011 | Kobayashi | H01G 4/232 361/306.3 |
| 2012/0151763 A1* | 6/2012 | Jung | H01G 4/30 29/846 |
| 2013/0229749 A1 | 9/2013 | Lee et al. | |
| 2014/0153156 A1* | 6/2014 | Park | H01G 4/30 361/303 |
| 2016/0126013 A1* | 5/2016 | Park | H01G 4/30 174/260 |
| 2016/0172108 A1* | 6/2016 | Ikeda | H01G 4/2325 361/301.4 |

FOREIGN PATENT DOCUMENTS

| | | | | |
|---|---|---|---|---|
| JP | 10284343 A | * | 10/1998 | H01G 4/005 |
| JP | 2003282350 A | * | 10/2003 | |
| JP | 2003-318059 A | | 11/2003 | |
| JP | 2006190774 A | * | 7/2006 | H01G 4/30 |
| JP | 2015026784 A | * | 2/2015 | |
| KR | 10-2013-0101319 A | | 9/2013 | |
| KR | 10-2016-0004655 A | | 1/2016 | |

\* cited by examiner

MULTILAYER CAPACITOR FOR IMPROVED BENDING STRENGTH CHARACTERISTICS

CROSS-REFERENCE TO RELATED APPLICATION(S)

This application claims the benefit of priority to Korean Patent Application No. 10-2018-0115497 filed on Sep. 28, 2018 in the Korean Intellectual Property Office, the disclosure of which is incorporated herein by reference in its entirety.

TECHNICAL FIELD

The present disclosure relates to a multilayer capacitor.

BACKGROUND

Multilayer capacitors are used as components in various electronic devices as they may be implemented to have a small size and high capacity.

In recent years, as interest in autonomous driving and electric vehicles has increased, power driving systems in automobiles have increased, and accordingly, demand for the multilayer capacitors required for automobiles has also increased.

In order to use the multilayer capacitors as the component for automobiles, a high level of electrical reliability and impact resistance are required.

In particular, after the multilayer capacitor is mounted on a substrate, strong resistance to deformation of the substrate is required.

SUMMARY

An aspect of the present disclosure may provide a multilayer capacitor capable of implementing excellent bending strength characteristics.

According to an aspect of the present disclosure, a multilayer capacitor may include a body including dielectric layers and a plurality of first and second internal electrodes having an average thickness less than 1 μm; and first and second external electrodes each including first and second conductive layers including first and second head portions disposed on opposing surfaces of the body and connected to exposed portions of the first and second internal electrodes and first and second band portions extending from the first and second head portions to portions of a mounting surface and opposite side surfaces of the body, and first and second conductive resin layers each covering the first and second conductive layers. An average thickness of the dielectric layers can be greater than the average thickness of the first and second internal electrodes, and portions of the first and second internal electrodes overlapping an end of the first or second band portion in a width direction of the body can be formed as first and second extending portions having a width relatively greater than those of other portions of the first and second internal electrodes, respectively.

The first extending portion may be disposed at the portion overlapping the end of the second band portion in the width direction of the body, and the second extending portion may be disposed at the portion overlapping the end of the first band portion in the width direction of the body.

The first extending portion may be disposed at the end of the first internal electrode, and the second extending portion may be disposed at the end of the second internal electrode.

The first extending portion may be disposed at the portion overlapping the end of the first band portion in the width direction of the body, and the second extending portion may be disposed at the portion overlapping the end of the second band portion in the width direction of the body.

The first and second extending portions may be formed in a rectangular shape or an oval shape.

We/Wm may be 0.3 or more, in which We is a length of one side of the first extending portion in the width direction of the body and Wm is a margin of one side of the body in the width direction of the body.

We/Wm may satisfy $0.5 \leq We/Wm \leq 0.6$.

The average thickness of the dielectric layers may be two or more times the average thickness of the first and second internal electrodes.

The first and second internal electrodes may be formed by sintering.

A distance from one end surface of the body to an end of the first or second band portion of the first or second conductive layer adjacent to the one end surface of the body may be shorter than a distance from the one end surface of the body to an end of the first or second conductive resin layer adjacent to the one end surface of the body.

The body may include first and second surfaces opposing each other, third and fourth surfaces connected to the first and second surfaces and opposing each other, and fifth and sixth surfaces connected to the first and second surfaces, connected to the third and fourth surfaces, and opposing each other, and includes a plurality of dielectric layers and the plurality of first and second internal electrodes alternately disposed in a direction connecting the first and second surfaces to each other while having the dielectric layer interposed therebetween, and one end of each of the first and second internal electrodes may be exposed through each of the third and fourth surfaces of the body.

The first and second conductive layers may include the first and second head portions disposed on the third and fourth surfaces of the body, respectively, and the first and second band portions may extend to portions of the first, fifth, and sixth surfaces of the body from the first and second head portions.

The multilayer capacitor may further include first and second plating layers covering the first and second external electrodes, respectively.

The first and second plating layers may include first and second nickel plating layers covering the first and second conductive resin layers, respectively, and first and second tin plating layers covering the first and second nickel plating layers, respectively.

According to another aspect of the present disclosure, a multilayer capacitor may include a body including dielectric layers and a plurality of internal electrodes; and external electrodes each including a conductive layer and a conductive resin layer covering the conductive layer. The conductive layer may include a head portion disposed on an end surface of the body and electrically connected to the plurality of internal electrodes and a band portion extending, in a length direction of the body, from the head portion to portions of a mounting surface and opposite side surfaces of the body. An average thickness of the dielectric layers can be greater than the average thickness of the plurality of internal electrodes. Each of the plurality of internal electrodes may include a first extending portion overlapping an end of the band portion in a width direction of the body and protruding from opposing sides of each of the plurality of internal electrodes in the width direction by a predetermined length, and the first extending portion may be disposed at a farther side from a portion electrically connected to the external electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
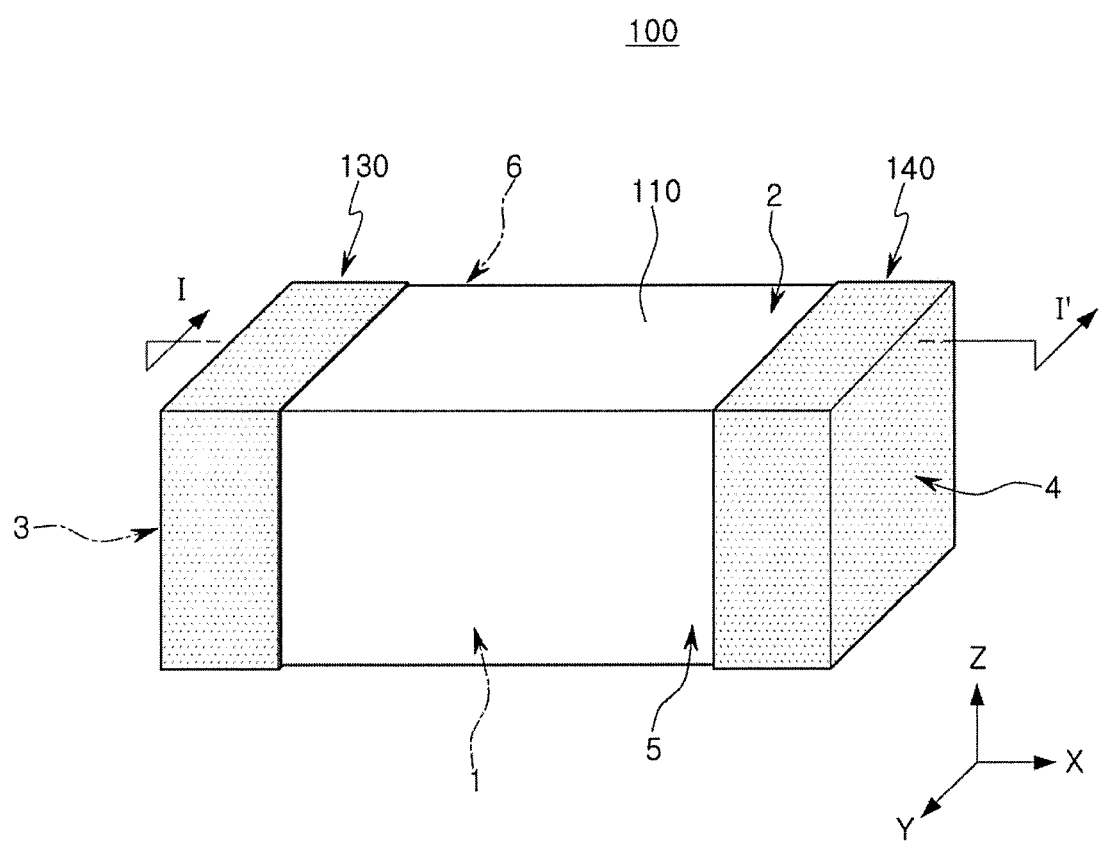
FIG. 1 is a perspective view illustrating a multilayer capacitor according to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor, respectively.

Here, the Z direction refers to a stacked direction in which dielectric layers are stacked in the present exemplary embodiment.

Figure 2:
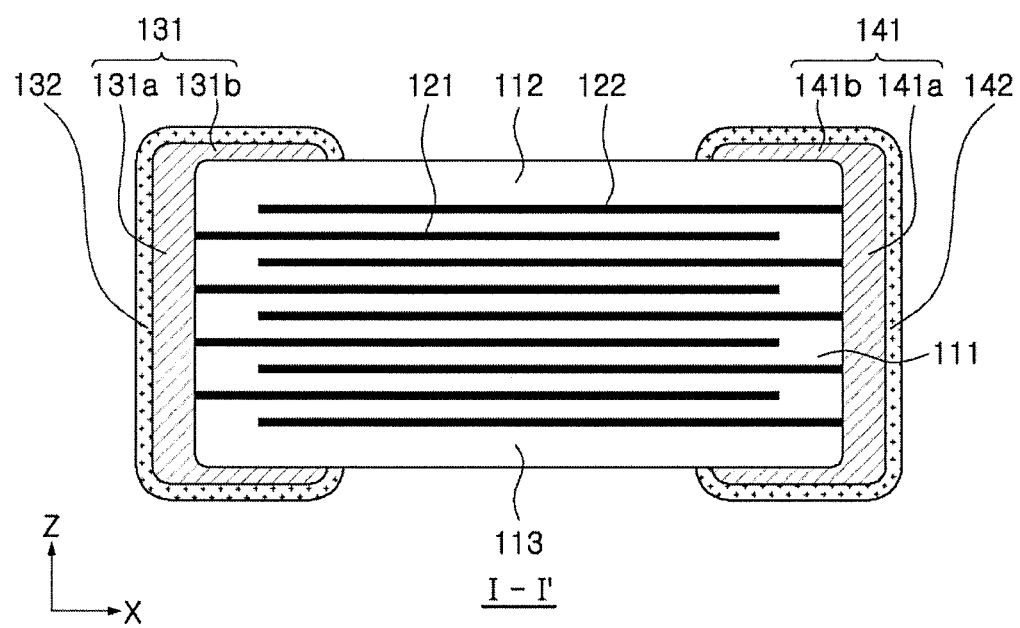
FIG. 2 is a cross-sectional view taken along line I-I' of FIG. 1.

FIG. 1 is a perspective view illustrating a multilayer capacitor according to an exemplary embodiment in the present disclosure and FIG. 2 is a cross-sectional view taken along line I-I' of FIG. 1.

Referring to FIGS. 1 and 2, a multilayer capacitor 100 according to the present exemplary embodiment may include a body 110 and first and second external electrodes 130 and 140.

The body 110 may be formed by stacking a plurality of dielectric layers 111 in a Z direction of the body 110 and then sintering the plurality of dielectric layers 111. The dielectric layers 111 adjacent to each other of the body 110 of the capacitor may be integrated with each other so that boundaries therebetween are not readily apparent without using a scanning electron microscope (SEM).

In addition, the body 110 may include the plurality of dielectric layers 111, and first and second internal electrodes 121 and 122 having different polarities alternately disposed in the Z direction of the body 110 while having the dielectric layers 111 interposed therebetween.

In addition, the body 110 may include an active region as a portion contributing to forming a capacitance of the capacitor, and cover regions 112 and 113 provided on both side surfaces of the body 110 of the capacitor in a Y direction of the body 110 and upper and lower surfaces of the active region in the Z direction as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a $BaTiO_3$ based ceramic powder or the like.

An example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which Ca, Zr, or the like, is partially dissolved in $BaTiO_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

In addition, an average thickness of the dielectric layers 111 may be greater than an average thickness of the first and second internal electrodes 121 and 122.

In this case, the average thickness of the dielectric layers 111 may be twice or more than the average thickness of the first and second internal electrodes 121 and 122.

The first and second internal electrodes 121 and 122, which are electrodes to which different polarities are applied, may be disposed on the dielectric layer 111 to be stacked in the Z direction of the body 110, and may be alternately disposed in the body 110 so as to opposite to each other in the Z direction of the body 110 while having one dielectric layer 111 interposed therebetween.

In this case, the first and second internal electrodes 121 and 122 may be electrically insulated from each other by the dielectric layer 111 disposed therebetween.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 130 and 140 disposed on the opposite end surfaces of the body 110 in the X direction of the body 110, respectively, to be described below.

According to the configuration as described above, when a predetermined voltage is applied to the first and second external electrodes 130 and 140, electric charges may be accumulated between the first and second internal electrodes 121 and 122.

In this case, a capacitance of the multilayer capacitor 100 may be in proportional to an overlapping area of the first and second internal electrodes 121 and 122 overlapping each other in the Z direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd—Ag) alloy, or the like, nickel (Ni), and copper (Cu).

At this time, a method of printing the conductive paste may be a screen printing method, a gravure printing method, or the like, but is not limited thereto.

In addition, the average thickness of the first and second internal electrodes 121 and 122 may be less than 1 µm.

Figure 3A:
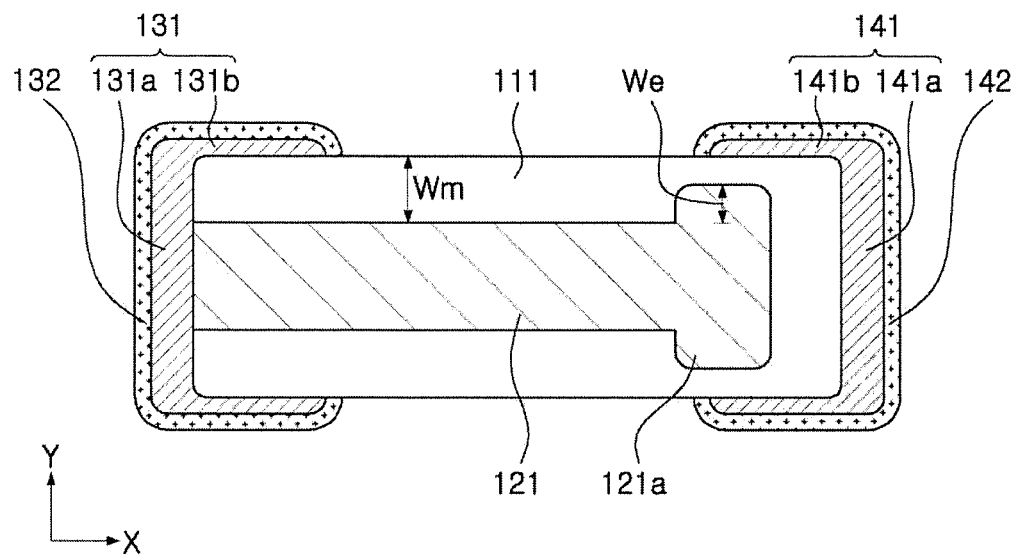
FIGS. 3A and 3B are cross-sectional views illustrating a structure of each of first and second internal electrodes in FIG. 1.

Referring to FIG. 3A, a portion of the first internal electrode 121 overlapping an end of a first or second band portion 131b or 141b in the Y direction of the body 110 may be formed as a first extending portion 121a having a width that is relatively greater than those of other portions of the first internal electrode 121.

In the present exemplary embodiment, the first extending portion 121a may be disposed in a location overlapping in the Y direction of the body 110 with the end of the second band portion 141b positioned on the opposite side of an end portion to which the first internal electrode 121 is exposed.

In this case, the first extending portion 121a may be disposed at the end of the first internal electrode 121 in the X direction of the body 110.

Figure 3B:
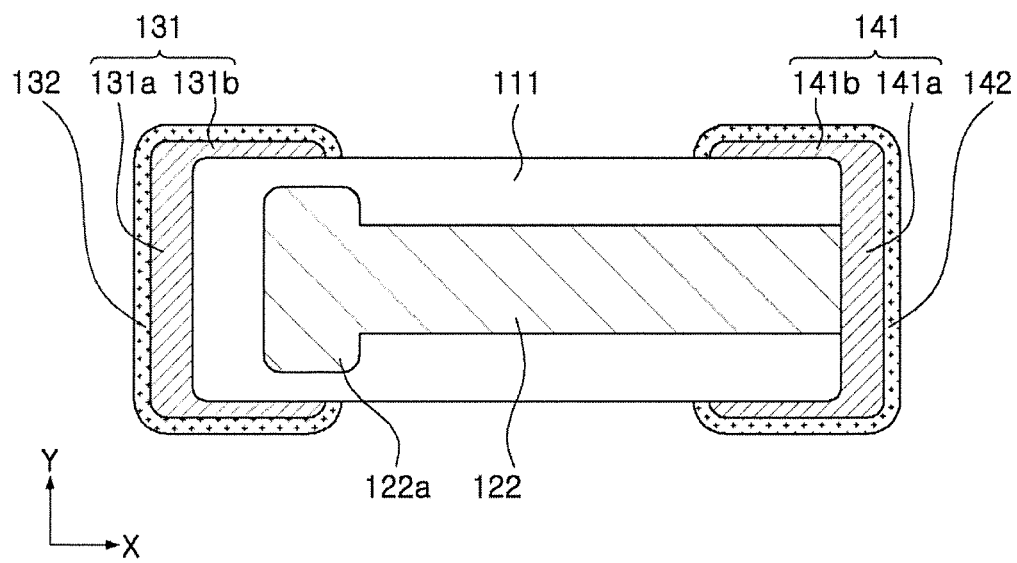

Referring to FIG. 3B, a portion of the second internal electrode 122 overlapping the end of the first or second band portion 131b or 141b in the Y direction of the body 110 may be formed as a second extending portion 122a having a width that is relatively greater than those of other portions of the second internal electrode 122.

In the present exemplary embodiment, the second extending portion 122a may be disposed in a location overlapping in the Y direction of the body 110 with the end of the first band portion 131b positioned on the opposite side of an end portion to which the second internal electrode 122 is exposed.

In this case, the second extending portion 122a may be disposed at the end of the second internal electrode 122 in the X direction of the body 110.

In addition, We/Wm may be 0.3 or more, in which We is a length of one side of the first and second extending portions 121a and 122a in the Y direction of the body 110, and Wm is a margin of one side of the body 110 in the Y direction of the body 110. In the case in which We/Wm is 0.3 or more, a bending strength of 6 mm may be ensured.

In addition, We/Wm may be 0.5 or more. In the case in which We/Wm is 0.5 or more, bending strength characteristics are further improved and as a result, the bending strength of 8 mm may also be ensured.

Meanwhile, We/Wm may be 0.6 or less. The reason is because a cutting defective rate may exceed 10% in a process of manufacturing the multilayer capacitor when We/Wm exceeds 0.6.

Figure 4A:
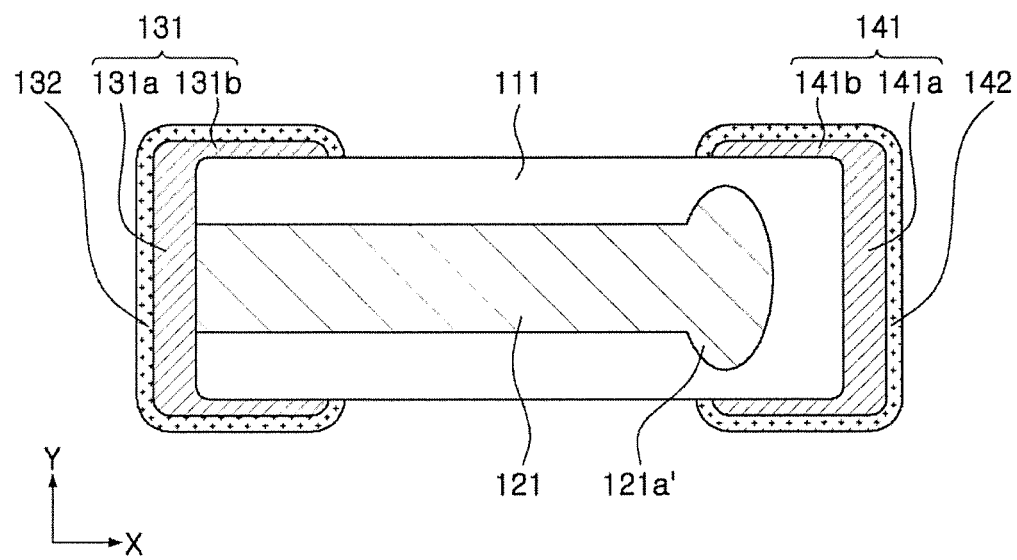
FIGS. 4A and 4B are cross-sectional views illustrating another example of each of the first and second internal electrodes.
Figure 4B:
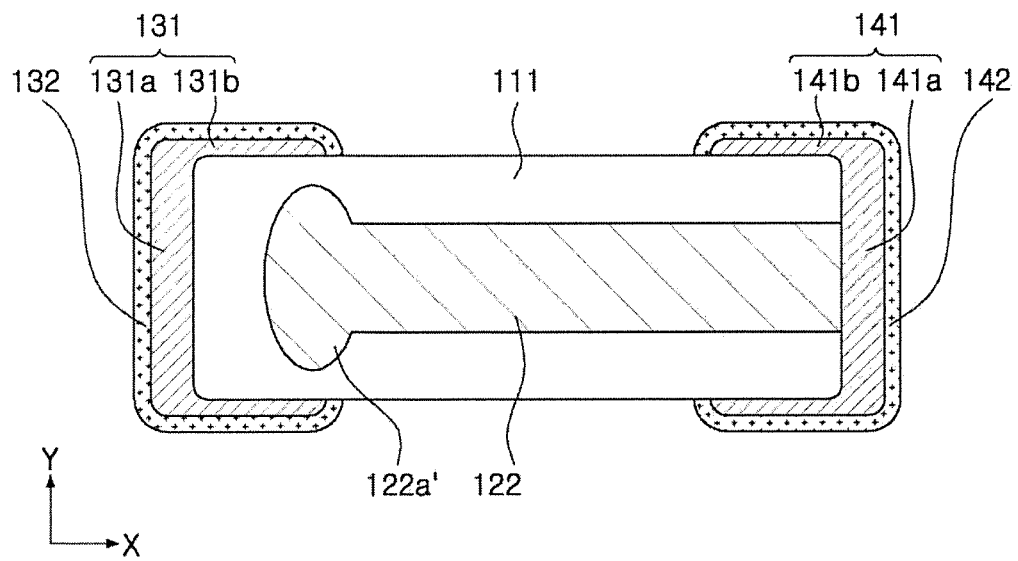

Meanwhile, FIGS. 3A and 3B illustrate that the first and second extending portions 121a and 122a are substantially formed in a rectangular shape, but the shape of the first and second extending portions 121a and 122a is not limited thereto. For example, first and second extending portions 121a' and 122a' may be substantially formed in an oval shape as illustrated in FIGS. 4A and 4B.

Figure 5A:
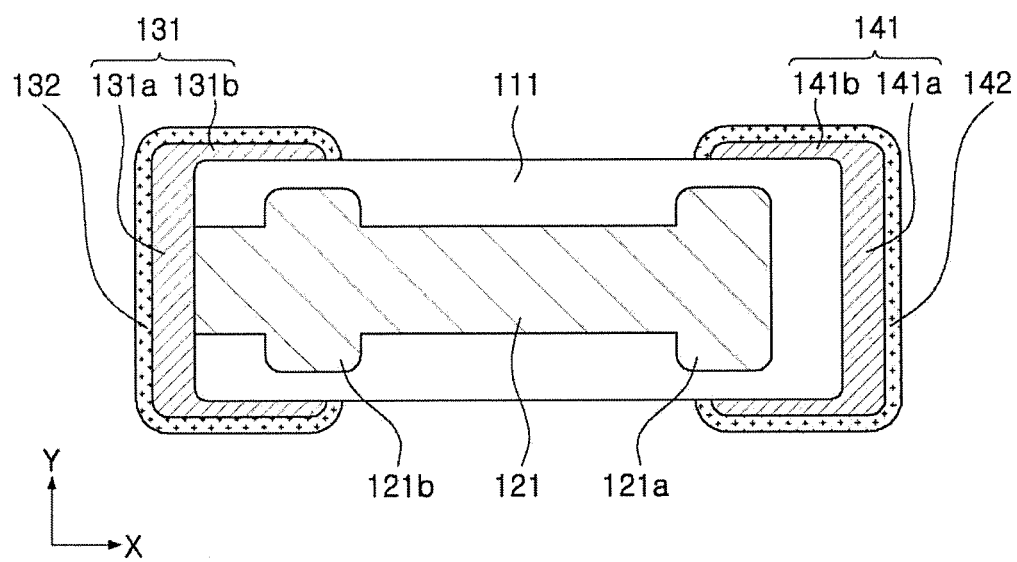
FIGS. 5A and 5B are cross-sectional views illustrating another example of each of the first and second internal electrodes.

As illustrated in FIG. 5A, a first extending portion 121b may be disposed at the portion overlapping the end of the first band portion 131b in the Y direction of the body 110.

In this case, FIG. 5A illustrates that each of the first extending portions 121a and 121b is disposed at each of the portions overlapping the ends of the first and second band portions 131b and 141b in the Y direction of the body 110, but the first extending portions 121a and 121b are not limited thereto. For example, the first extending portion 121b may be disposed only at the portion overlapping the end of the first band portion 131b in the Y direction of the body 110.

Figure 5B:
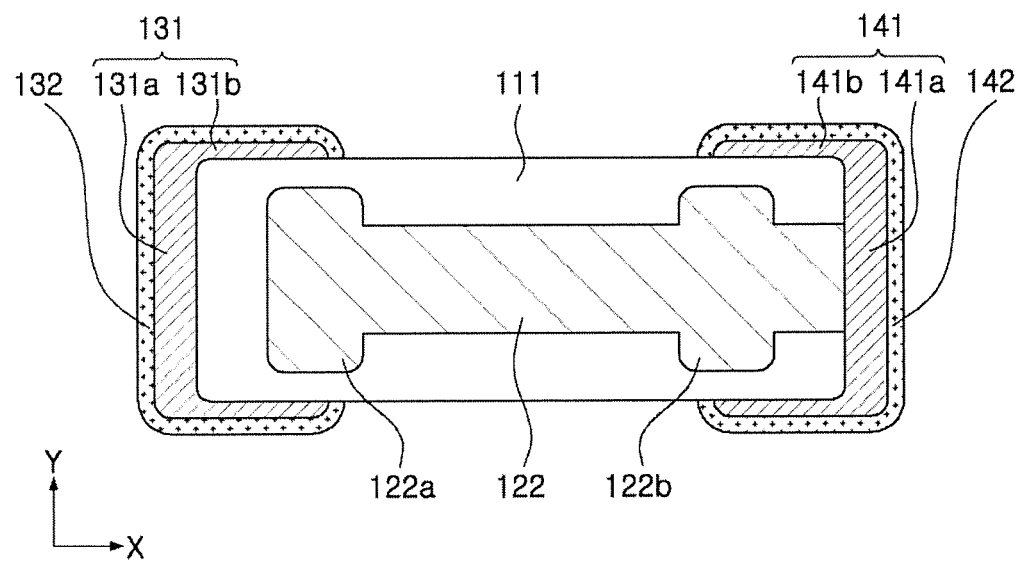

Referring to FIG. 5B, a second extending portion 122b may be disposed at the portion overlapping the end of the second band portion 141b in the Y direction of the body 110.

In this case, FIG. 5B illustrates that each of the second extending portions 122a and 122b is disposed at each of the portions overlapping the ends of the first and second band portions 131b and 141b in the Y direction of the body 110, but the second extending portions 122a and 122b are not limited thereto. For example, the second extending portion 122b may be disposed only at the portion overlapping the end of the second band portion 141b in the Y direction of the body 110.

Figure 6A:
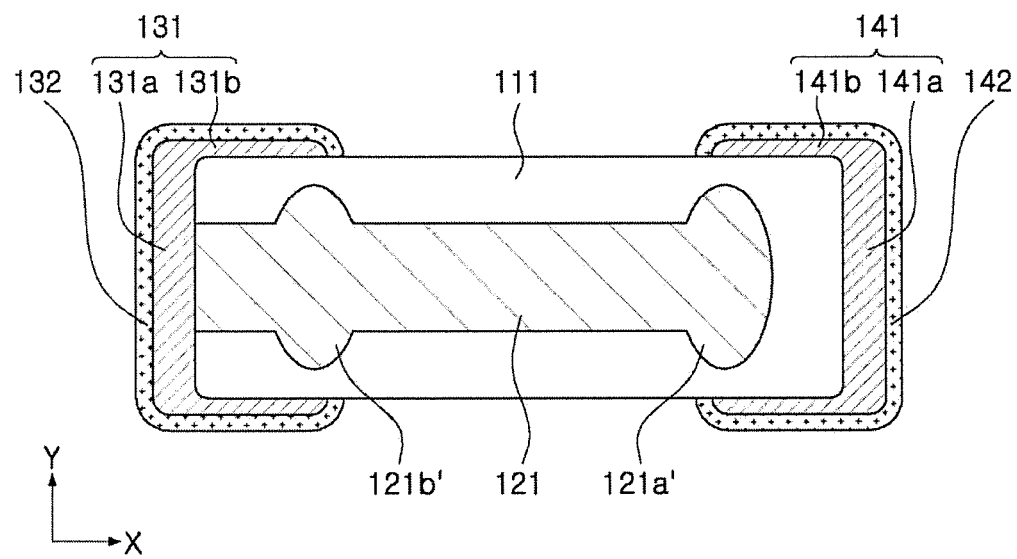
FIGS. 6A and 6B are cross-sectional views illustrating another example of each of the first and second internal electrodes.
Figure 6B:
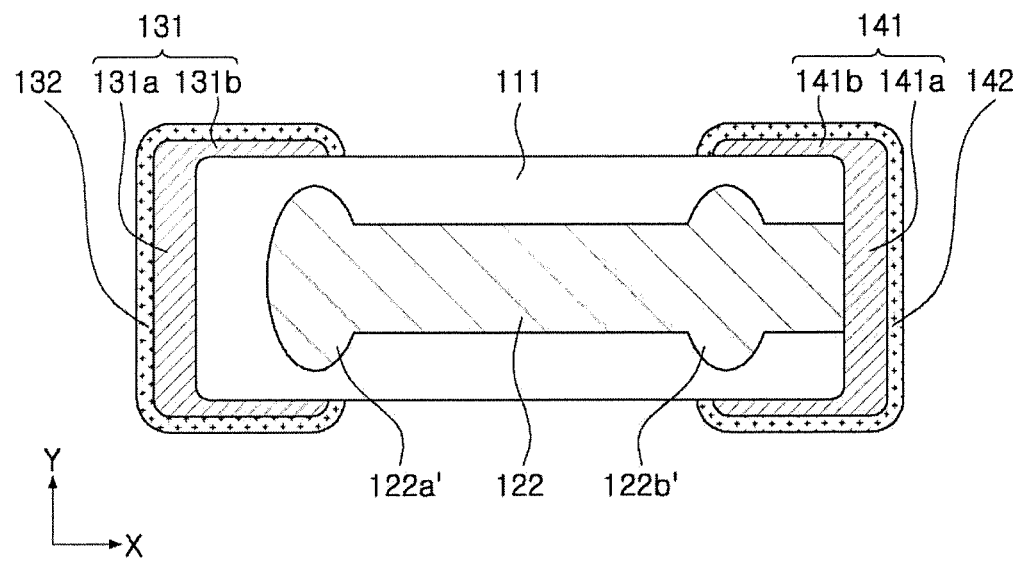

Meanwhile, FIGS. 5A and 5B illustrate that the first extending portions 121a and 121b and the second extending portions 122a and 122b are substantially formed in a rectangular shape, but the shape of the first and second extending portions is not limited thereto. For example, first extending portions 121a' and 121b' and second extending portions 122a' and 122b' may be substantially formed in an oval shape as illustrated in FIGS. 6A and 6B.

Voltages having different polarities may be provided to the first and second external electrodes 130 and 140, and the first and second external electrodes 130 and 140 may be disposed on the opposite end surfaces of the body 110 in the X direction of the body 110, and may be electrically connected to the exposed end portions of the first and second internal electrodes 121 and 122, respectively.

The first external electrode 130 may include a first conductive layer 131 and a first conductive resin layer 132.

The first conductive layer 131 may be disposed on a surface of the body 110 and may be connected to the exposed end portion of the first internal electrode 121.

In addition, the first conductive layer 131 may be formed by sintering.

Such a first conductive layer 131 may include a first head portion 131a and a first band portion 131b.

The first head portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 130 to each other.

The first band portion 131b may be a portion extending from the first head portion 131a to portions of the first, fifth, and sixth surfaces 1, 5, and 6 of the body 110 to improve fixing strength.

In this case, the first band portion 131b may extend to a portion of the second surface 2 of the body 110 from the first head portion 131a, if necessary.

The first conductive resin layer 132 may cover the first conductive layer 131.

In this case, a distance from the third surface 3 of the body 110 to an end of the first band portion 131b of the first conductive layer 131 in the X direction of the body 110 may be shorter than a distance from the third surface 3 of the body 110 to an end of the first conductive resin layer 132 in the X direction of the body 110.

The second external electrode 140 may include a second conductive layer 141 and a second conductive resin layer 142.

The second conductive layer 141 may be disposed on the surface of the body 110 and may be connected to the exposed end portion of the second internal electrode 122.

In addition, the second conductive layer 141 may be formed by sintering.

Such a second conductive layer 141 may include a second head portion 141a and a second band portion 141b.

The second head portion 141a may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 140 to each other.

The second band portion 141b may be a portion extending from the second head portion 141a to portions of the first, fifth, and sixth surfaces 1, 5, and 6 of the body 110 to improve fixing strength.

In this case, the second band portion 141b may extend to a portion of the second surface 2 of the body 110 from the second head portion 141a, if necessary.

The second conductive resin layer 142 may cover the second conductive layer 141.

In this case, a distance from the fourth surface 4 of the body 110 to an end of the second band portion 141b of the second conductive layer 141 in the X direction of the body 110 may be shorter than a distance from the fourth surface 4 of the body 110 to an end of the second conductive resin layer 142 in the X direction of the body 110.

Figure 7:
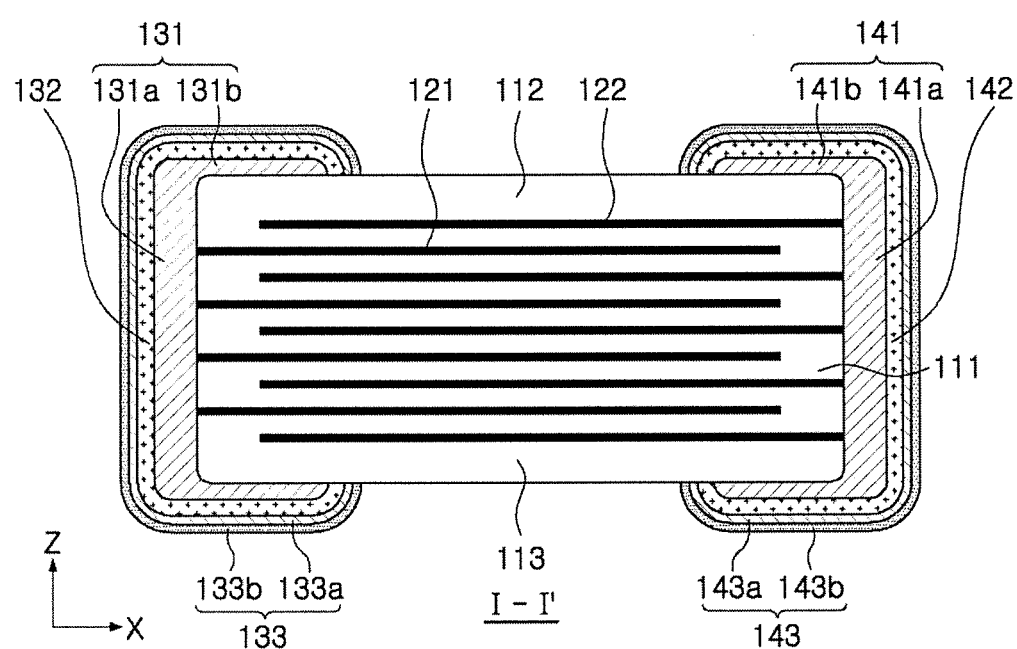
FIG. 7 is a cross-sectional view illustrating a case in which plating layers are further formed in FIG. 2.

Referring to FIG. 7, the first external electrode 130 may further include a first plating layer 133.

The first plating layer 133 may cover the first conductive resin layer 132.

Such a first plating layer 133 may include a first nickel (Ni) plating layer 133a covering the first conductive resin layer 132, and a first tin (Sn) plating layer 133b covering the first nickel plating layer 133a.

The second external electrode 140 may further include a second plating layer 143.

The second plating layer 143 may cover the second conductive resin layer 142.

Such a second plating layer 143 may include a second nickel plating layer 143a covering the second conductive resin layer 142, and a second tin plating layer 143b covering the second nickel plating layer 143a.

In the multilayer capacitor, a bending crack mainly occurs at the ends of the band portions of the external electrodes.

In order to prevent such a bending crack, the conventional multilayer capacitor implements bending strength characteristics by sufficiently securing the number of stacked internal electrodes that affect a capacitance implementation and the number of stacked patterns in the same direction which do not affect the capacitance implementation. However, in a case in which the bending strength characteristics intend to be implemented by simply securing the number of stacked internal electrodes or patterns, as the stacked number is increased, production efficiency may be lowered.

In the multilayer capacitor according to the present exemplary embodiment, the portion of the internal electrode overlapping the end of the band portion of the external electrode may be formed as the extending portion having the width relatively greater than those of other portions of the internal electrode.

As a result, since an area of the portion of the internal electrode overlapping the end of the band portion is relatively larger, tensile strength of the portion of the body susceptible to a bending crack can be increased to improve the bending strength characteristics of the multilayered capacitor.

Experimental Example

Table 1 below illustrates an occurrence frequency of a bending crack according to a ratio of a length of an extending portion in the Y direction of the body 110 to a margin of the body 110 in the Y direction thereof.

The multilayer capacitor used in the present experiment is manufactured so as to have a length in the X direction of 3.2 mm, a length in the Y direction of 1.6 mm, and electrical characteristics of 1 μF.

In the present experiment, a multilayer capacitor which has been subjected to a temperature cycle of 100 times from −55° C. to 125° C. is mounted on a substrate, and then a surface of the substrate on which the multilayer capacitor is mounted faces downwardly.

In addition, after supports are positioned at positions spaced apart from both sides of the multilayer capacitor by a predetermined distance, the opposite surface of the surface of the substrate on which the multilayer capacitor is mounted is repeatedly pressed until the substrate is deformed by a distance of 4 mm, 5 mm, 6 mm, 7 mm, and 8 mm, respectively, to check whether a crack occurs in the multilayer capacitor or a current value rapidly increases.

In this case, a length of one side of the first extending portion in the Y direction of the body 110 is defined as We, a margin of one side of the body 110 in the Y direction thereof is defined as Wm, 60 samples having We/Wm of 0, 0.5, 0.1, 0.2, 0.3, 0.4, and 0.5, respectively, are prepared, and a bending crack test is performed.

TABLE 1

| # | We/Wm | Occurrence Frequency of Bending Crack (EA) | | | | |
|---|---|---|---|---|---|---|
| | | 4 mm | 5 mm | 6 mm | 7 mm | 8 mm |
| 1 | 0 | 1/60 | 1/60 | 3/60 | 4/60 | 7/60 |
| 2 | 0.05 | 0/60 | 1/60 | 1/60 | 3/60 | 4/60 |
| 3 | 0.1 | 0/60 | 0/60 | 1/60 | 0/60 | 1/60 |
| 4 | 0.2 | 0/60 | 0/60 | 1/60 | 1/60 | 0/60 |
| 5 | 0.3 | 0/60 | 0/60 | 0/60 | 1/60 | 1/60 |
| 6 | 0.4 | 0/60 | 0/60 | 0/60 | 1/60 | 0/60 |
| 7 | 0.5 | 0/60 | 0/60 | 0/60 | 0/60 | 0/60 |

Referring to Table 1, in the case of Sample 1 to 4 having We/Wm which is less than 0.3, defect was found in a bending strength test of 6 mm.

In addition, in the case of Sample 5 having We/Wm of 0.3, no defect was founded in the bending strength test of 6 mm. As a result, it may be seen in the present exemplary embodiment that a preferable value of We/Wm is 0.3 or more.

In addition, in the case of Sample 7 having We/Wm of 0.5, no defect was also founded in a bending strength test of 8 mm. As a result, it may be seen in the present exemplary embodiment that a more preferable value of We/Wm is 0.5 or more.

Table 2 below illustrates a cutting defective rate in a process of manufacturing the multilayer capacitor according to a ratio of a length of an extending portion in the Y direction of the body 110 to a margin of the body 110 in the Y direction thereof.

In the present experiment, a multilayer capacitor having the same specification as that of the multilayer capacitor of Table 1 was used.

TABLE 2

| # | We/Wm | Cutting Defective Rate (%) |
|---|---|---|
| 8 | 0.25 | 0.26 |
| 9 | 0.35 | 0.78 |
| 10 | 0.45 | 1.70 |

TABLE 2-continued

| # | We/Wm | Cutting Defective Rate (%) |
|---|---|---|
| 11 | 0.55 | 5.60 |
| 12 | 0.60 | 9.18 |
| 13 | 0.65 | 11.18 |

Referring to Table 2, in the case of Samples 8 to 12 having We/Wm of 0.6 or less, the cutting defective rate was 10% or less.

Therefore, in the present exemplary embodiment, when a tolerance of the cutting defective rate is 10% or less, a value of We/Wm may be 0.6 or less.

As set forth above, according to the exemplary embodiment in the present disclosure, the tensile strength of the multilayer capacitor may be improved to improve the bending strength.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including dielectric layers and a plurality of first and second internal electrodes having an average thickness less than 1 μm; and
a first external electrode and a second external electrode respectively including first and second conductive layers and first and second conductive resin layers respectively covering the first and second conductive layers,
wherein the first and second conductive layers respectively include first and second head portions disposed on opposing surfaces of the body and electrically connected to exposed portions of the plurality of first and second internal electrodes and first and second band portions extending, in a length direction of the body, from the first and second head portions to portions of a mounting surface and opposite side surfaces of the body,
wherein an average thickness of the dielectric layers is greater than the average thickness of the plurality of first and second internal electrodes,
wherein the plurality of first and second internal electrodes each include first and second extending portions respectively overlapping each end of the first and second band portions in a width direction of the body, each of the first and second extending portions having a width relatively greater than a width of an end portion adjacent to the first or second head portion and a width of a middle portion, of the plurality of first and second internal electrodes, respectively,
wherein the first and second extending portions are arranged only in respective portions overlapping each end of the first and second band portions in the width direction, and
wherein the first and second extending portions have a constant width with each other.

2. The multilayer capacitor of claim 1, wherein the first extending portion is disposed at an end of each of the plurality of first internal electrodes, and
the second extending portion is disposed at an end of each of the plurality of second internal electrodes.

3. The multilayer capacitor of claim 1, wherein the first and second extending portions are formed in a rectangular shape or an oval shape.

4. The multilayer capacitor of claim 1, wherein We/Wm is 0.3 or more, in which "We" is a length of one side of the first extending portion in the width direction of the body and "Wm" is a margin of one side of the body in the width direction of the body.

5. The multilayer capacitor of claim 4, wherein We/Wm is 0.5 or more.

6. The multilayer capacitor of claim 5, wherein We/Wm satisfies 0.5≤We/Wm≤0.6.

7. The multilayer capacitor of claim 1, wherein the average thickness of the dielectric layers is two or more times the average thickness of the plurality of first and second internal electrodes.

8. The multilayer capacitor of claim 1, wherein the plurality of first and second internal electrodes are formed by sintering.

9. The multilayer capacitor of claim 1, wherein a distance, in the length direction, from one end surface of the body to the end of the first or second band portion of the first or second conductive layer adjacent to the one end surface of the body is shorter than a distance, in the length direction, from the one end surface of the body to an end of the first or second conductive resin layer adjacent to the one end surface of the body.

10. The multilayer capacitor of claim 1, wherein the body includes first and second surfaces opposing each other, third and fourth surfaces connected to the first and second surfaces and opposing each other, and fifth and sixth surfaces connected to the first and second surfaces, connected to the third and fourth surfaces, and opposing each other, and includes the dielectric layers and the plurality of first and second internal electrodes alternately disposed in a direction connecting the first and second surfaces to each other while having each of the dielectric layers interposed therebetween, and
one end of each of the plurality of first and second internal electrodes is exposed through the third and fourth surfaces of the body, respectively.

11. The multilayer capacitor of claim 10, wherein the first and second conductive layers include the first and second head portions disposed on the third and fourth surfaces of the body, respectively, and
the first and second band portions extend to portions of the first, fifth, and sixth surfaces of the body from the first and second head portions.

12. The multilayer capacitor of claim 1, further comprising first and second plating layers covering the first and second external electrodes, respectively.

13. The multilayer capacitor of claim 12, wherein the first and second plating layers include first and second nickel plating layers covering the first and second conductive resin layers, respectively, and first and second tin plating layers covering the first and second nickel plating layers, respectively.

14. A multilayer capacitor comprising:
a body including dielectric layers and a plurality of internal electrodes; and
external electrodes each including a conductive layer and a conductive resin layer covering the conductive layer,
wherein the conductive layer includes a head portion disposed on an end surface of the body and electrically connected to the plurality of internal electrodes and a band portion extending, in a length direct ion of the body, from the head portion to portions of a mounting surface and opposite side surfaces of the body, wherein an average thickness of the dielectric layers is greater than the average thickness of the plurality of internal electrodes, wherein the plurality of internal electrodes each comprise a first extending portion overlapping an end of the band portion in a width direction of the body and protruding from opposing sides of each of the plurality of internal electrodes in the width direction by a predetermined length, the first extending portion disposed at a farther side from a portion electrically connected to the external electrodes, wherein each of the plurality of internal electrodes further comprises a second extending portion overlapping an end of the band portion in the width direction and protruding from opposing sides of each of the plurality of internal electrodes in the width direction by a predetermined length, the second extending portion disposed at a nearer side from the portion electrically connected to the external electrodes, wherein the first and second extending portions each have a width relatively greater than a width of an end portion adjacent to the head portion and a width of a middle portion, of each of the plurality of internal electrodes, wherein the first and second extending portions are arranged only in portions overlapping respective ends of the band portions in the width direction, and wherein the first and second extending portions have a constant width with each other.

15. The multilayer capacitor of claim 14, wherein the first extending portion is disposed at an end portion of each of the plurality of internal electrodes, and the second extending portion is disposed at another middle portion of each of the plurality of internal electrodes between the end portion and the portion electrically connected to the external electrodes.

16. The multilayer capacitor of claim 14, wherein the first extending portion is formed in a rectangular shape or an oval shape.

17. The multilayer capacitor of claim 14, wherein We/Wm is 0.3 or more, in which "We" is the predetermined length of the first extending portion and "Wm" is a margin of one side of the body in the width direction of the body.

18. A multilayer capacitor comprising:
a body including dielectric layers and a plurality of first and second internal electrodes having an average thickness less than 1 μm; and
a first external electrode and a second external electrode respectively including first and second conductive layers and first and second conductive resin layers respectively covering the first and second conductive layers,
wherein the first and second conductive layers respectively include first and second head portions disposed on opposing surfaces of the body and electrically connected to exposed portions of the plurality of first and second internal electrodes and first and second band portions extending, in a length direction of the body, from the first and second head portions to portions of a mounting surface and opposite side surfaces of the body,
wherein an average thickness of the dielectric layers is greater than the average thickness of the plurality of first and second internal electrodes,
wherein the plurality of first and second internal electrodes each include first and second extending portions respectively overlapping each end of the first and second band portions in a width direction of the body, each of the first and second extending portions having a width relatively greater than a width of an end portion adjacent to the first or second head portion and a width of a middle portion, of the plurality of first and second internal electrodes, respectively,
wherein the first and second extending portions are arranged only in respective portions overlapping each end of the first and second band portions in the width direction, and
wherein the end portion adjacent to the first or second head portion and the middle portion of the first and second internal electrodes have a constant width with each other.

* * * * *

UNITED STATES PATENT AND TRADEMARK OFFICE
CERTIFICATE OF CORRECTION

PATENT NO. : 10,614,956 B1
APPLICATION NO. : 16/189779
DATED : April 7, 2020
INVENTOR(S) : Do Young Jeong Page 1 of 1

It is certified that error appears in the above-identified patent and that said Letters Patent is hereby corrected as shown below:

On the Title Page

Please add:
--(30) Foreign Application Priority Data:
September 28, 2018 (KR) ............ 10-2018-00115497--

Signed and Sealed this
Thirtieth Day of June, 2020

Andrei Iancu
*Director of the United States Patent and Trademark Office*